(12) United States Patent
Tschanz et al.

(10) Patent No.: US 7,684,520 B2
(45) Date of Patent: Mar. 23, 2010

(54) METHOD AND APPARATUS FOR BUS REPEATER TAPERING

(75) Inventors: James W. Tschanz, Hillsboro, OR (US); Muhammad M. Khellah, Lake Oswego, OR (US); Yibin Ye, Hillsboro, OR (US); Vivek K. De, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 2021 days.

(21) Appl. No.: 10/334,746

(22) Filed: Dec. 31, 2002

(65) Prior Publication Data

US 2004/0125826 A1 Jul. 1, 2004

(51) Int. Cl.
*H04L 27/00* (2006.01)

(52) U.S. Cl. .................. 375/326; 340/425.1; 342/353; 370/226; 370/243; 370/246; 370/492; 370/501; 379/338

(58) Field of Classification Search ................. 326/108; 327/51, 318; 359/337; 375/213, 316; 716/8
See application file for complete search history.

(56) References Cited

U.S. PATENT DOCUMENTS 6,163,174 A * 12/2000 Friedman et al. ............ 326/108

OTHER PUBLICATIONS

Vemuru et al; Variable-taper CMOS buffers; Sep. 1991; IEEE Journal of Solid State Electronics; vol. 26; pp. 1265-1269.*

* cited by examiner

*Primary Examiner*—David C Payne
*Assistant Examiner*—Adolf Dsouza
(74) *Attorney, Agent, or Firm*—Garrett IP, LLC (57) ABSTRACT

A method and apparatus for bus repeater tapering. The sizing of repeaters on a portion of one transmission line is chosen to propagate a signal transition at a particular rate. The sizing of repeaters on a substantially parallel portion of another transmission line, is chosen to propagate a second signal transition at a different rate. Thus, the worst-case capacitance coupling factor between the two transmission lines may be reduced.

17 Claims, 9 Drawing Sheets

METHOD AND APPARATUS FOR BUS REPEATER TAPERING

FIELD OF THE DISCLOSURE

This disclosure relates generally to the field of interconnect systems and busses for transmission of digital data. In particular, the disclosure relates to repeater tapering which may result in a reduction of coupling capacitance on multiple-line interconnects or busses.

BACKGROUND OF THE DISCLOSURE

As signals in electronic devices switch at higher and higher frequencies, delays of on-chip interconnects represent increasingly significant considerations for performance and power consumption. High frequency signaling and smaller feature sizes made possible by advanced processing techniques magnify the importance of signal timing. In order to reduce delays and/or save energy, a number of prior techniques have been tried.

Static buses are simple in design and have lower switching activity. The lower switching activity can reduce power consumption. However, speed and power consumption, of a particular interconnect segment also depend on the switching activity of adjacent wires. Unfortunately, while a wire can have a voltage transitioning in one direction each adjacent wire can have a transition in the opposite direction. This results in a coupling capacitance that is twice as large as the actual inter-line capacitance (a coupling factor of 2). Therefore, a significant worst-case delay may occur on a static bus when neighboring lines switch in opposite directions.

The effective coupling capacitance of a line is the actual inter-line capacitance multiplied by the coupling factor. Ideally, the coupling factor has a value of 1 when there is no transition in the neighboring lines, 2 when transitions occur in opposite directions and 0 when transitions occur in the same direction. For conventional static bus drivers and repeaters, the worst-case value of the coupling factor is 2, which increases worst-case delay, energy and peak supply current.

In a dynamic bus, interconnect segments precharge during one phase of the clock and conditionally evaluate in the next phase. Because all segments precharge and evaluate in the same direction, the worst-case coupling factor is reduced to 1. However, dynamic circuits require additional clock signals and have greater switching activity. The greater switching activity of dynamic circuits can consume more power than static circuits.

Another technique, static pulsed busses, employ pulse generators to send a pulse along the static bus each time there is an input data transition. Since the pulses are in the same direction, the worst-case coupling factor is the same as a dynamic bus with some of the switching activity advantages of a static design. However, additional logic and some additional delays are associated with a pulse generator and a pulse decoder.

BRIEF DESCRIPTION OF THE DRAWINGS

The present invention is illustrated by way of example and not limitation in the figures of the accompanying drawings.

DETAILED DESCRIPTION

A method and apparatus for bus repeater tapering is disclosed herein. For one embodiment of a static bus, the sizing of repeaters on a portion of one transmission line is chosen to propagate a signal transition at a particular rate. The sizing of repeaters on a substantially parallel portion of another transmission line, is chosen to propagate a second signal transition at a different rate. In this manner, the worst-case capacitance coupling factor between the two transmission lines may be reduced, thereby providing substantially for reduced delay advantages of a dynamic bus with the switching activity advantages and simplicity of a static bus.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

For the purpose of the following discussion of embodiments of the present invention, illustrative terms are used. Definitions for certain such illustrative terms follows.

A transmission line may be understood to mean any one of a variety of devices for transmitting signals, current, waves, pulses, voltage-level transitions, etc. It may comprise a planar, rectangular, cylindrical or linear, rigid or flexible surface, wire or trace including but not limited to a combination of one or more conductors and/or semiconductors, repeaters, buffers, latches, and circuits.

Repeater tapering may be understood to mean a directional reduction in size, number of devices, or speed of repeaters or of portions of repeaters along a signal path.

The RC delay of a transmission line is the line resistance times the effective line capacitance. Coupling capacitance between neighboring lines can be a significant fraction (half) of the line capacitance. The effective coupling capacitance of a line depends on signal transitions in neighboring lines. In the worst-case a neighboring line has a simultaneous signal transition in an opposite direction, thereby providing a coupling factor of 2, which is multiplied by the inter-line capacitance. The delay of a bus may be significantly reduced if this worst-case condition can be avoided.

Figure 1:
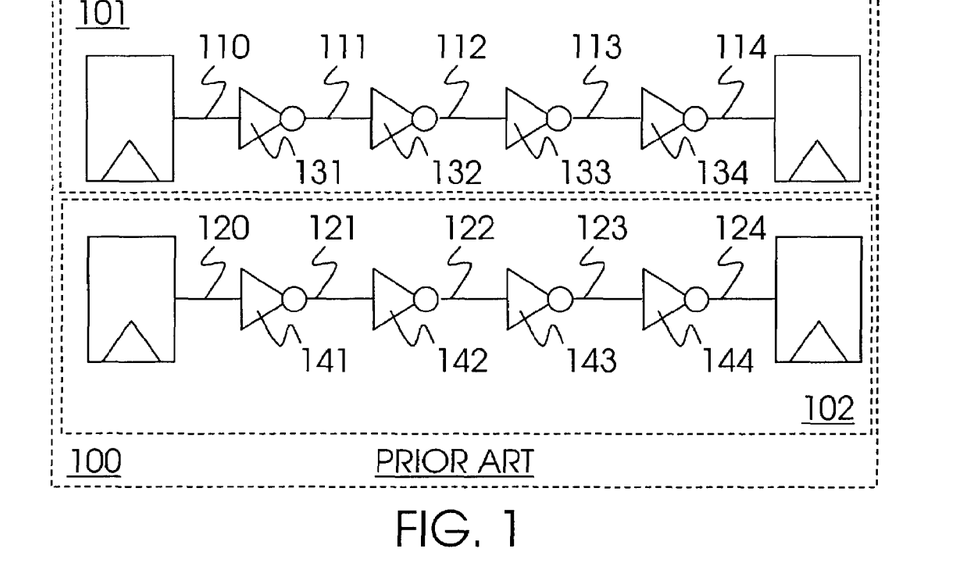
FIG. 1 illustrates prior-art static transmission lines with repeaters.

FIG. 1 illustrates a pair 100 of prior-art static transmission lines 101 and 102 with repeaters 131-134 and 141-144 respectively. Each of the repeaters 131-134 is substantially the same size as repeaters 141-144 and substantially the same size as each other. Therefore, signal transitions for static transmission lines 101 and 102 will be propagated on transmission line segments 111-114 and 121-124 at substantially equal rates.

Figure 2:
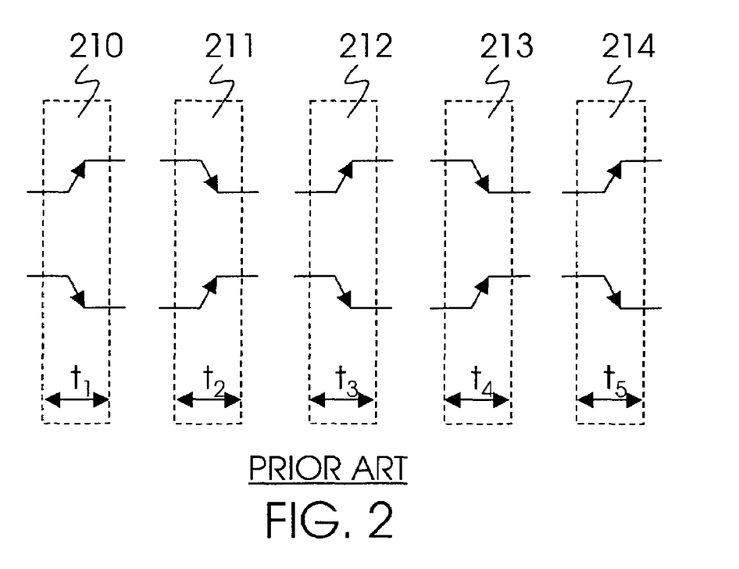
FIG. 2 illustrates the timing of a worst-case signal transition on prior-art static transmission lines.

FIG. 2, for example, illustrates the timing of a worst-case signal transition on prior-art static transmission lines 101 and 102. During the time $t_1$, signal transitions 210 propagate at substantially the equal rates on transmission line segments 110 and 120 to repeaters 131 and 141 respectively. In the worst case, the signal transition on transmission lines 101 and 102 are in opposite directions. Therefore a coupling factor of 2 is produced, which effectively doubles the inter-line capacitance and slows down the signal propagations on both of transmission line segments 110 and 120. Since repeaters 131 and 141 are sized to propagate the signal transitions at substantially equal rates, signal transitions 211 propagate on transmission line segments 111 and 121 to repeaters 132 and 142 in a similar manner, producing a coupling factor of 2 during time $t_2$ and slowing down the signal propagations on both of transmission line segments 111 and 121. Similarly, a coupling factor of 2 is produced for each of signal transitions 212, 213 and 214 since repeaters 132 and 142, 133 and 143, 134 and 144 are sized to propagate their respective signal transitions at substantially equal rates.

Figure 3:
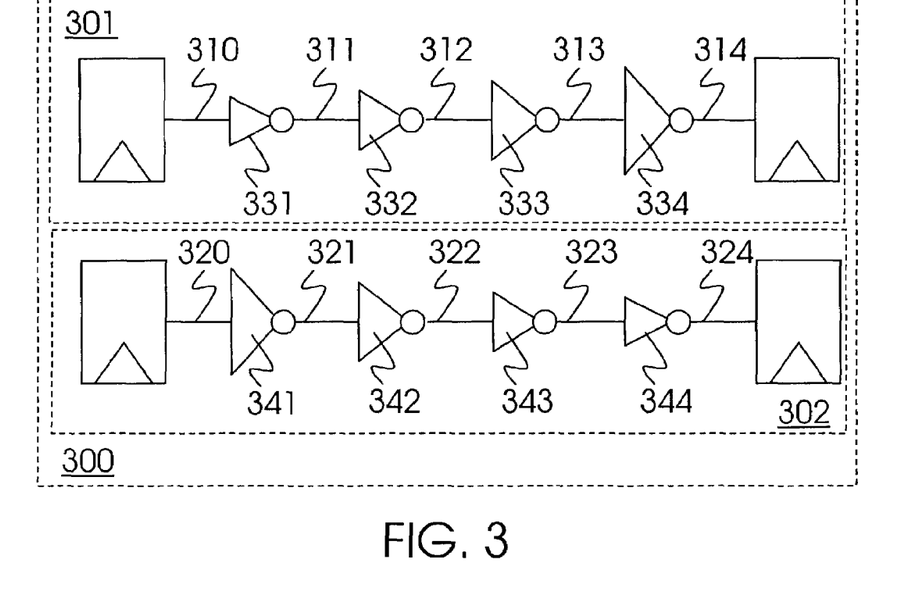
FIG. 3 illustrates one embodiment of static transmission lines with repeater tapering.

FIG. 3 illustrates one embodiment of a pair 300 of static transmission lines 301 and 302 with tapered repeaters 331-334 and 341-344 respectively. For one embodiment of the pair 300 of static transmission lines, each of the repeaters 331-334 is sized to propagate a signal transition on a segment of transmission line 301 at a respective rate, and each of repeaters 341-344 is sized to propagate a signal transition on a segment of transmission line 302 at a respective rate different from the rate of propagation on a substantially parallel corresponding segment of transmission line 301. Therefore, signal transitions for static transmission lines 301 and 302 will not be propagated on transmission line segments 311-314 and 321-324 at substantially equal rates. For one embodiment of the pair 300 of static transmission lines, repeater 331 is significantly smaller than repeater 341 and repeater 332-334 sizes are sequentially increasing while repeater 342-344 sizes are sequentially decreasing. In other words, repeater 331-334 sizes are tapered in a direction toward the signal source while repeater 341-344 sizes are tapered in a direction away from the signal source. Thus, tapering repeaters on alternating transmission lines of a bus in opposite directions, a worst-case coupling factor of 2 may be avoided.

Figure 4:
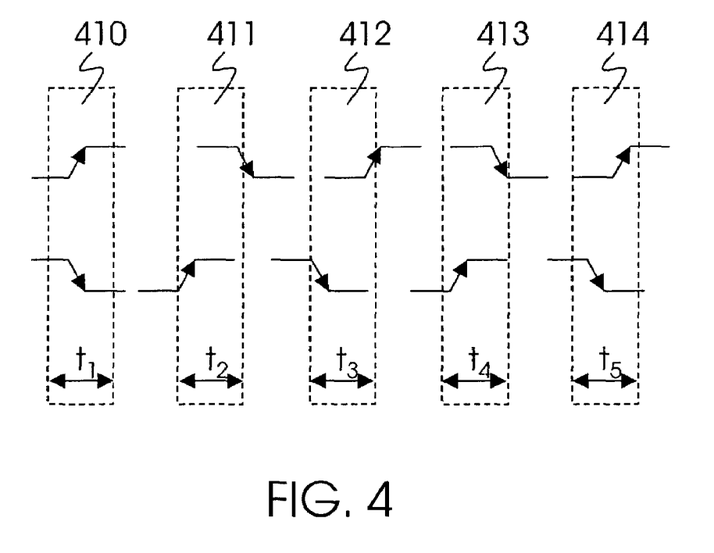
FIG. 4 illustrates the timing of a worst-case signal transition on one embodiment of transmission lines with repeater tapering.

FIG. 4 illustrates the timing of a worst-case signal transition on one embodiment of transmission lines 301 and 302 with repeater tapering. During the time $t_1$, signal transitions 410 initially propagate at substantially the equal rates on transmission line segments 310 and 320 to repeaters 331 and 341 respectively. If the signal transition on transmission lines 301 and 302 are in opposite directions, a coupling factor of 2 is produced, which effectively doubles the inter-line capacitance and slows down the signal propagations on both of transmission line segments 310 and 320. This worst case coupling for initial line segments 310 and 320 is merely to illustrate, contrasting it with the effect of repeater tapering on line segments 311-314 and 321-314. It will be appreciated that while initial transmission line segments (e.g. 310 and 320) are illustrated in this and subsequent figures as substantially equal in length in comparison with, for example, transmission line segments 311-314 and 321-324, the initial transmission line segment lengths may be conveniently selected as short as possible (even of zero length) to avoid their undesirable worst-case coupling factors of 2.

Since repeaters 331 and 341 are sized to propagate the signal transitions at different rates, the signal transition from repeater 341 occurs earlier (i.e. at the beginning of $t_2$) than the later signal transition from repeater 331 (i.e. near the end of $t_2$). Therefore, the signal transitions 411 do not occur at the same time as they propagate on transmission line segments 311 and 321 to repeaters 332 and 342 reducing the coupling factor to a value of 1 during time $t_2$.

Subsequently, repeaters 332-334 are tapered to gradually increase the rate at which the signal transition is propagated on transmission line 301 and repeaters 342-344 are tapered to gradually decrease the rate at which the signal transition is propagated on transmission line 302 without permitting the transitions to overlap, thereby maintaining a worst-case coupling factor of 1 for each of signal transitions 412, 413 and 414. In order to achieve the desired reduction of the worst-case coupling factor for each pair of substantially parallel adjacent transmission line segments, it may be desirable in one embodiment to have more than half of the rise time or fall time of the signal transitions (which ever takes longer) separate the midpoints of worst-case transitions in time. In another embodiment, it may be desirable to have at least the entire rise time or fall time of the signal transitions (which ever takes longer) separate the midpoints of transitions. Since the worst case delay associated with a coupling factor of 2 is greater than the delay introduced, for example, on transmission line segment 311 by non-optimal repeater sizing, overall system performance may be improved.

Figure 5:
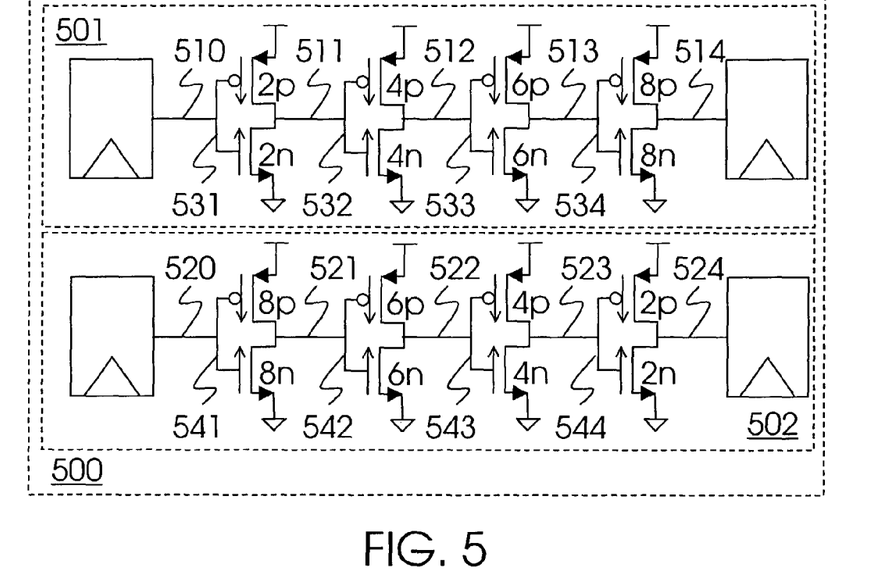
FIG. 5 illustrates one alternative embodiment of static transmission lines with repeater tapering.

FIG. 5 illustrates one alternative embodiment of a pair 500 of static transmission lines 501 and 502 with tapered repeaters 531-534 and 541-544 respectively. For one embodiment of the pair 500 of static transmission lines, each of the repeaters 531-534 is sized to propagate a signal transition on a segment of transmission line 501 at a respective rate, and each of repeaters 541-544 is sized to propagate a signal transition on a segment of transmission line 502 at a respective rate different from the rate of propagation on a substantially parallel corresponding segment of transmission line 501. For one embodiment of the pair 500 of static transmission lines, repeater 531 has a p-type transistor of size $2p$ and an n-type transistor of size $2n$, which is significantly smaller than the p-type transistor of size $8p$ and the n-type transistor of size $8n$ for repeater 541. Repeater 532, having a p-type transistor of size $4p$ and an n-type transistor of size $4n$; repeater 533 having a p-type transistor of size $6p$ and an n-type transistor of size $6n$; and repeater 534 having a p-type transistor of size $8p$ and an n-type transistor of size $8n$ are sequentially increasing or tapered in a direction toward the signal source. On the other hand, repeater 542 having a p-type transistor of size $6p$ and an n-type transistor of size $6n$; repeater 543 having a p-type transistor of size $4p$ and an n-type transistor of size $4n$; and repeater 544 having a p-type transistor of size $2p$ and an n-type transistor of size $2n$ are sequentially decreasing or tapered in a direction away from the signal source.

It will be appreciated that actual differences in device sizing may be limited by noise constraints, by robustness constraints, and by minimum rise and fall time constraints on the signals. Therefore, while in one embodiment, it may be possible to use a repeater with a p-type transistor four times the size of the n-type transistor, it may not be appropriate to that embodiment to use a repeater with a p-type transistor, for example, eight times the size of the corresponding n-type transistor. Therefore, it will be understood that the sizes $2p$, $4p$, $6p$, $8p$ and $2n$, $4n$, $6n$ and $8n$, etc., illustrated in this and subsequent figures are merely illustrative and that true device sizes may be conveniently allocated according to actual design considerations such as noise, signal timing constraints, process technology, bus lengths, power consumption, etc.

As mentioned above, it will also be appreciated that, while initial transmission line segments are illustrated in this and subsequent figures as substantially equal in length in comparison with later transmission line segments, for example, 511-514 and 521-524, the initial transmission line segment lengths may be conveniently selected as short as possible (even of zero length) to avoid undesirable worst-case coupling factors of 2.

Figure 6:
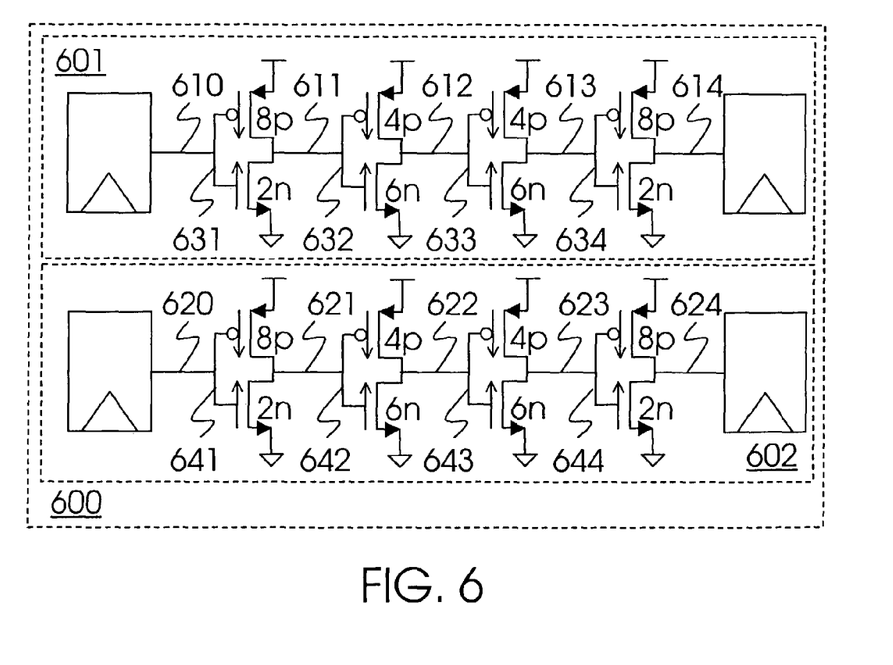
FIG. 6 illustrates another alternative embodiment of static transmission lines with repeater tapering.

FIG. 6 illustrates another alternative embodiment of a pair 600 of static transmission lines 601 and 602 with tapered repeaters 631-634 and 641-644 respectively. For one embodiment of the pair 600 of static transmission lines, each of the repeaters 631-634 is sized to propagate a signal transition on a segment of transmission line 601 at a respective rate, and each of repeaters 641-644 is sized to propagate an opposite signal transition on a segment of transmission line 602 at a respective rate different from the rate of propagation on a substantially parallel corresponding segment of transmission line 601.

For one embodiment of the pair 600 of static transmission lines, both of repeaters 631 and 641 have p-type transistors of size $8p$, which is significantly larger than their n-type transistors of size $2n$. Therefore, the propagation rates on transmission line segments 611 and 621 will be faster for the higher-voltage-level-to-lower-voltage-level transitions on transmission line segments 610 and 620 than for the lower-voltage-level-to-higher-voltage-level transitions. Repeaters 632 and 642, having n-type transistor of size $6n$; repeaters 633 and 643 having p-type transistors of size $4p$; and repeaters 634 and 644 having n-type transistors of size $2n$ are sequentially decreasing or tapered in a direction away from the signal source for a higher-voltage-level-to-lower-voltage-level transition on transmission line segments 610 and 620. Thus repeaters 631-634 are tapered in a direction with respect to the propagation of a higher-voltage-level-to-lower-voltage-level signal transition, which is the same direction that repeaters 641-644 are tapered with respect to the propagation of a substantially similar signal transition. On the other hand, repeaters 632 and 642, having p-type transistor of size $4p$; repeaters 633 and 643 having n-type transistors of size $6n$; and repeaters 634 and 644 having p-type transistors of size $8p$ are, at the same time, sequentially increasing or tapered in a direction towards the signal source for a lower-voltage-level-to-higher-voltage-level transition on transmission line segments 610 and 620. Again, repeaters 631-634 are tapered in a direction with respect to the propagation of a lower-voltage-level-to-higher-voltage-level signal transition, which is the same direction that repeaters 641-644 are tapered with respect to the propagation of a substantially similar signal transition, but which is the opposite direction that they are tapered with respect to the propagation of a higher-voltage-level-to-lower-voltage-level signal transition. It will be appreciated that while inverting repeaters have been used to illustrate alternative embodiments of repeater tapering, similar techniques may be applied to non-inverting repeaters as well. Thus, tapering repeaters on transmission lines of a bus in opposite directions for the higher-voltage-level-to-lower-voltage-level transitions and the lower-voltage-level-to-higher-voltage-level transitions, a worst-case coupling factor of 2 may be avoided.

It will also be appreciated that while in FIG. 6 each of the repeaters 631-634 is sized to propagate a signal transition on a segment of transmission line 601 at a respective rate, and each of repeaters 641-644 is sized to propagate an opposite signal transition on a segment of transmission line 602 at a respective rate different from the rate of propagation on a substantially parallel corresponding segment of transmission line 601, tapering techniques may be applied to some but not all repeaters of a transmission line without departing from the principles of the present invention. For example, inserting one or more repeaters with balanced p-type and n-type transistors between tapered repeaters would not diminish the effectiveness of the tapered repeaters in reducing the worst-case coupling factor for adjacent transmission lines.

Figure 7:
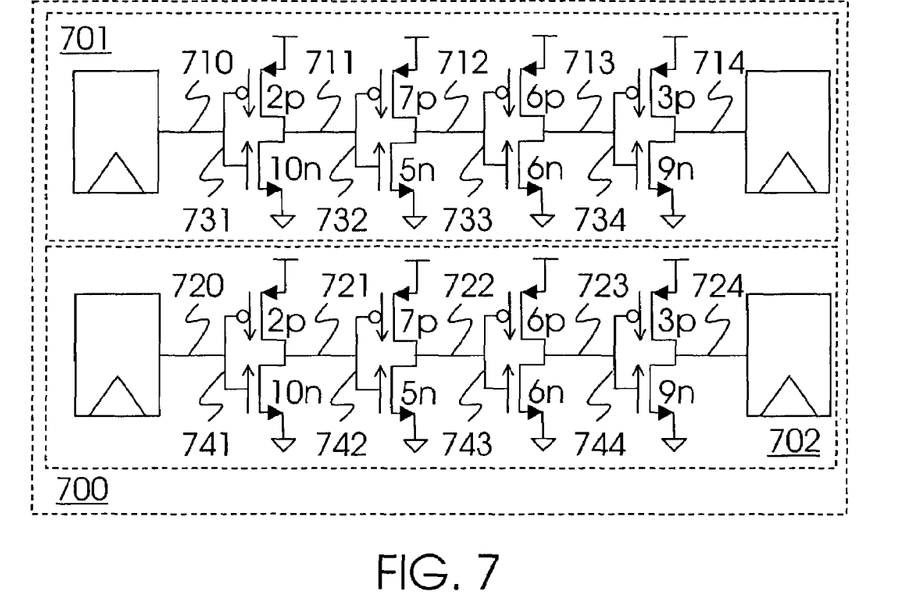
FIG. 7 illustrates another alternative embodiment of static transmission lines with repeater tapering.

FIG. 7 illustrates another alternative embodiment of a pair 700 of static transmission lines 701 and 702 with tapered repeaters. For one embodiment of the pair 700 of static transmission lines, each of the repeaters 731, 732 and 734 is sized to propagate a signal transition on a segment of transmission line 701 at a respective rate, and each of repeaters 741, 742 and 744 is sized to propagate an opposite signal transition on a segment of transmission line 702 at a respective rate different from the rate of propagation on a substantially parallel corresponding segment of transmission line 701. Repeaters 733 and 743, on the other hand, represent balanced repeaters, which are sized to propagate opposite signal transitions at substantially equal rates, but since they follow at least one of repeaters 731-732 and 741-742 respectively, they do not diminish the effectiveness of the repeater tapering in reducing the worst-case coupling factor for adjacent transmission lines. It will also be appreciated that even though the sizes $2p$, $5n$, $6p$, $9n$, and $10n$, $7p$, $6n$, and $3p$ are consistent with one embodiment of tapering repeaters in opposite directions for the higher-voltage-level-to-lower-voltage-level transitions and the lower-voltage-level-to-higher-voltage-level transitions; repeaters 733 and 743 could also have been given, for example, p-type transistor sizes of $8p$ and n-type transistor sizes of $8n$ without diminishing the effectiveness of the repeater tapering or departing from the principles of the present invention.

For one embodiment of the pair 700 of static transmission lines, both of repeaters 731 and 741 have p-type transistors of size $2p$, which is significantly smaller than their n-type transistors of size $10n$. Therefore, the propagation rates on transmission line segments 711 and 721 will be slower for the higher-voltage-level-to-lower-voltage-level transitions on transmission line segments 710 and 720 than for the lower-voltage-level-to-higher-voltage-level transitions. Repeaters 732 and 742, having n-type transistor of size $5n$; and repeaters 734 and 744 having n-type transistors of size $9n$ are sequentially increasing or tapered in a direction toward the signal source for a higher-voltage-level-to-lower-voltage-level transition on transmission line segments 710 and 720. On the other hand, repeaters 732 and 742, having p-type transistors of size $7p$; and repeaters 734 and 744 having p-type transistors of size $3p$ are also sequentially decreasing or tapered in a direction away from the signal source for a lower-voltage-level-to-higher-voltage-level transition on transmission line segments 710 and 720.

As mentioned above, one or more repeaters with balanced p-type and n-type transistors may be inserted after the tapered repeaters 731-734 and 741-744 without diminishing the effectiveness of the tapered repeaters in reducing the worst-case coupling factor for adjacent transmission lines. Dependent upon whether the repeaters are inverting or non-inverting and whether the number of inserted balanced repeaters is odd or even, the tapering scheme may be adjusted, for example, by exchanging the p-type transistor sizes with the n-type transistor sizes of subsequent tapered repeaters. Thus, tapering repeaters on transmission lines of a bus in opposite directions for the higher-voltage-level-to-lower-voltage-level transitions and the lower-voltage-level-to-higher-voltage-level transitions, a worst-case coupling factor of 2 may be avoided.

Figure 8:
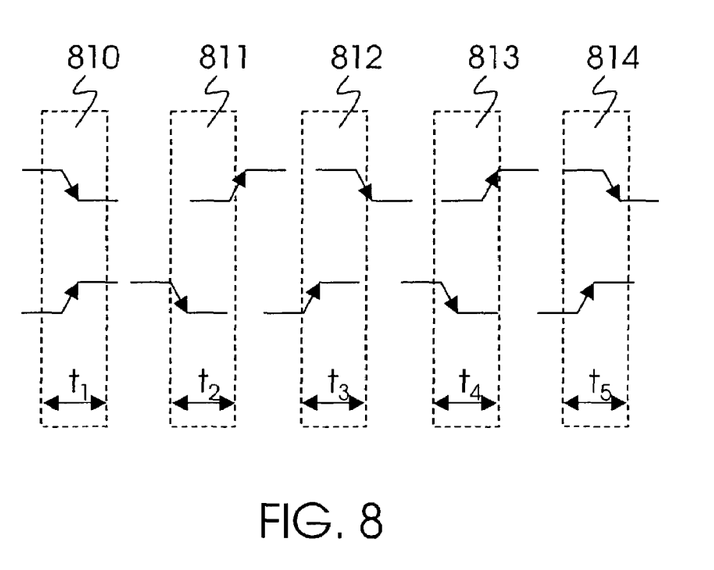
FIG. 8 illustrates the timing of a worst-case signal transition on one alternative embodiment of transmission lines with repeater tapering.

FIG. 8 illustrates the timing of a worst-case signal transition on one embodiment of, for example, transmission lines 701 and 702 with repeater tapering. During the time $t_1$, signal transitions 810 initially propagate at substantially equal rates on transmission line segments 710 and 720 to repeaters 731 and 741 respectively. If the signal transitions on transmission lines 701 and 702 are in opposite directions (higher-voltage-level-to-lower-voltage-level versus lower-voltage-level-to-higher-voltage-level) a coupling factor of 2 is produced, which effectively doubles the inter-line capacitance and slows down the signal propagations on both of transmission line segments 710 and 720. This worst case coupling for initial line segments 710 and 720 is merely to illustrate, contrasting it with the effect of repeater tapering on line segments 711-714 and 721-714. The initial transmission line segment lengths may be conveniently selected as short as possible (even of zero length) to avoid undesirable worst-case coupling factors of 2.

Since repeaters 731 and 741 are sized to propagate worst-case signal transitions at different rates, the higher-voltage-level-to-lower-voltage-level signal transition from the n-type transistor of repeater 741 occurs earlier (i.e. at the beginning of $t_2$) than the lower-voltage-level-to-higher-voltage-level signal transition from the p-type transistor of repeater 731 (i.e. near the end of $t_2$). Therefore, the signal transitions 811 do not occur at the same time as they propagate on transmission line segments 711 and 721 toward repeaters 732 and 742 thereby reducing the coupling factor to a value of 1 during time $t_2$.

Subsequently, repeaters 732 and 734 are tapered to gradually increase the rate at which the signal transition is propagated on transmission line 701 with respect to the rate at which the signal transition is propagated on transmission line 702, and repeaters 742 and 744 are tapered to gradually decrease the rate at which the signal transition is propagated on transmission line 702 with respect to the rate at which the signal transition is propagated on transmission line 701 without permitting the transitions to overlap, thereby maintaining a worst-case coupling factor of 1 for signal transitions 412 and 414. Balanced repeaters, such as repeaters 733 and 743, may not propagate worst-case signal transitions at different rates but do not diminish the effectiveness of the tapered repeaters in reducing the worst-case coupling factor for the signal transitions 813 during time $t_4$.

It will be appreciated that while in FIGS. 5-7 each of the repeaters is illustrated as comprising only one p-type transistor and only one n-type transistor, tapering techniques may be applied to multi-legged repeaters, for example changing the number and or the sizes of transistors without departing from the principles of the present invention.

Figure 9:
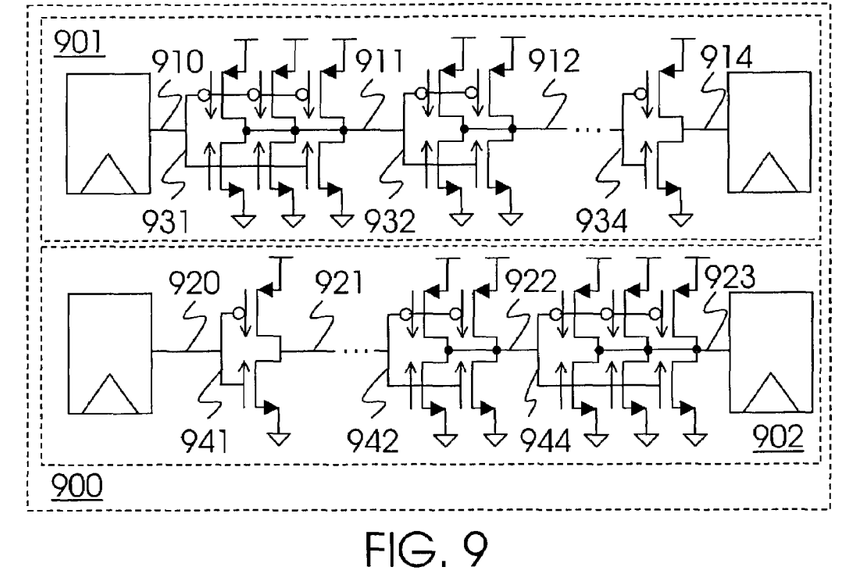
FIG. 9 illustrates another alternative embodiment of static transmission lines with repeater tapering.

For example, FIG. 9 illustrates another alternative embodiment of a pair 900 of static transmission lines 901 and 902 with tapered repeaters 931-934 and 941-944 respectively. For one embodiment of the pair 900 of static transmission lines, each of the repeaters 931 and 934 are sized to propagate a signal transition on a segment of transmission line 901 at a respective rate, and each of repeaters 941 and 944 is sized to propagate a signal transition on a segment of transmission line 902 at a respective rate different from the rate of propagation on a substantially parallel corresponding segment of transmission line 901. For one embodiment of the pair 900 of static transmission lines, transmission line 901 and 902 may also include one or more balanced repeaters, repeaters 932 and 942 for example. Therefore, signal transitions for static transmission lines 901 and 902 will not be propagated on transmission line segments 911 and 921 or on transmission line segments 914 and 924 at substantially equal rates. Moreover, since worst-case signal transitions will not overlap on transmission line segments 911 and 921 insertion of one or more balanced repeaters, repeaters 932 and 942 for example, need not diminish the effectiveness of tapered repeaters in reducing the worst-case coupling factors for transmission line segments 912 and 922.

For one embodiment of the pair 900 of static transmission lines, repeater 931 is significantly larger than repeater 941 and repeater 932 and 934 sizes are sequentially decreasing while repeater 942 and 944 sizes are sequentially increasing.

For one embodiment of the pair 900 of static transmission lines, repeater 931 has three p-type transistors and three n-type transistors, which is significantly larger than the one p-type transistor and the one n-type transistor of repeater 941. Repeater 932, having two p-type transistors and two n-type transistors; and repeater 934 having one p-type transistor and one n-type transistor are tapered in a direction away from the signal source. On the other hand, repeater 942 having two p-type transistors and two n-type transistors; and repeater 944 having three p-type transistors and three n-type transistors are tapered in a direction towards the signal source. Thus, tapering repeaters on alternating transmission lines of a bus in opposite directions, a worst-case coupling factor of 2 may be avoided.

Figure 10:
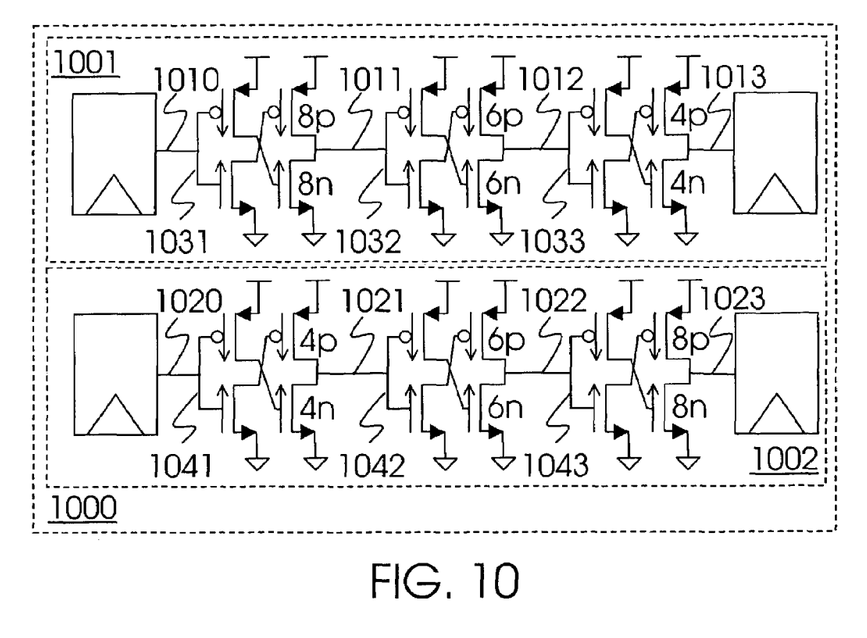
FIG. 10 illustrates another alternative embodiment of static transmission lines with repeater tapering.

FIG. 10 illustrates another alternative embodiment of a pair 1000 of static transmission lines 1001 and 1002 with non-inverting tapered repeaters 1031-1033 and 1041-1043 respectively. For one embodiment of the pair 1000 of static transmission lines, each of the repeaters 1031 and 1033 is sized to propagate a signal transition on a segment of transmission line 1001 at a respective rate, and each of repeaters 1041 and 1043 is sized to propagate a signal transition on a segment of transmission line 1002 at a respective rate different from the rate of propagation on a substantially parallel corresponding segment of transmission line 1001. Therefore, signal transitions for static transmission lines 1001 and 1002 will not be propagated on transmission line segments 1011 and 1021 or on transmission line segments 1013 and 1023 at substantially equal rates. Further, since worst-case signal transitions will not overlap on transmission line segments 1011 and 1021 insertion of one or more balanced repeaters, repeaters 1032 and 1042 for example, need not diminish the effectiveness of tapered repeaters in reducing the worst-case coupling factors for transmission line segments 1012 and 1022.

For one embodiment of the pair 1000 of static transmission lines, two inverters make up each non-inverting repeater 1031-1033 and 1041-1043. It will be appreciated that there are numerous different possible sizing combinations for each inverter pair resulting in repeaters that are tapered. For one embodiment of the pair 1000 of static transmission lines, in each of the repeaters 1031, 1033, 1041 and 1043, for example, the sizes of the first inverter in the pairs are combined with the sizes of the corresponding second inverter to propagate a signal transition on respective segments of transmission line 1001 and transmission line 1002 at different rates. For an alternative embodiment of the pair 1000 of static transmission lines, in each of the repeaters 1031-1033 and 1041-1043, the first inverter in the pair may be assumed to be of a uniform size, which is smaller than the corresponding second inverter.

For one embodiment of the pair 1000 of static transmission lines, repeater 1031 has a p-type transistor of size 8$p$ and an n-type transistor of size 8$n$ to propagate a signal transition on transmission line segment 1011. Repeater 1031 is larger than repeater 1041, which has a p-type transistor of size 4$p$ and the n-type transistor of size 4$n$ to propagate a signal transition on transmission line segment 1021. Repeater 1032, having a p-type transistor of size 6$p$ and an n-type transistor of size 6$n$ connected with transmission line segment 1012; and repeater 1033 having a p-type transistor of size 4$p$ and an n-type transistor of size 4$n$ connected with transmission line segment 1013 are sequentially decreasing or tapered in a direction away from the signal source. On the other hand, repeater 1042 having a p-type transistor of size 6$p$ and an n-type transistor of size 6$n$ connected with transmission line segment 1022; and repeater 1043 having a p-type transistor of size 8$p$ and an n-type transistor of size 8$n$ connected with transmission line segment 1023 are sequentially increasing or tapered in a direction towards the signal source. Thus, tapering repeaters on alternating transmission lines of a bus in opposite directions, a worst-case coupling factor of 2 may be avoided.

Figure 11:
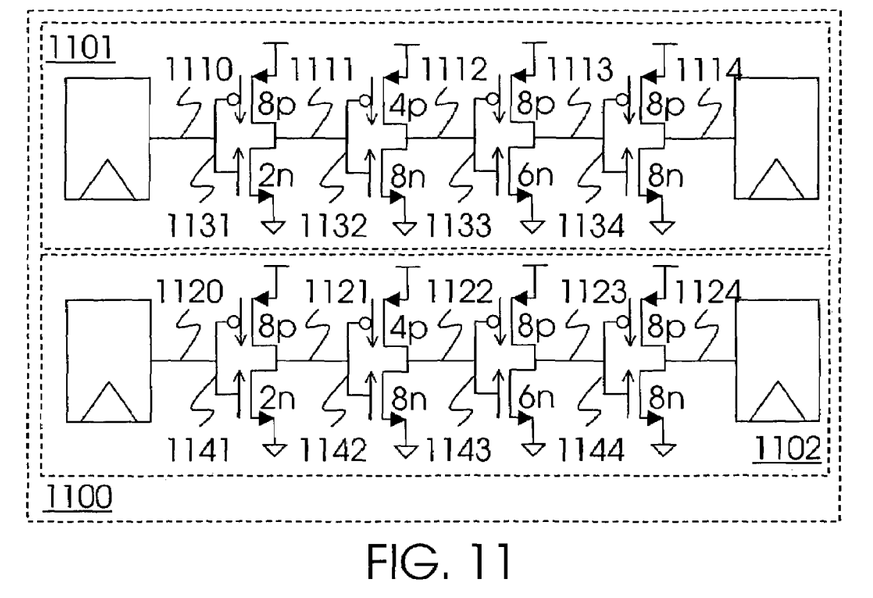
FIG. 11 illustrates another alternative embodiment of static transmission lines with repeater tapering.

FIG. 11 illustrates another alternative embodiment of a pair 1100 of static transmission lines 1101 and 1102 with tapered repeaters. For one embodiment of the pair 1100 of static transmission lines, each of the repeaters 1131-1133 is sized to propagate a signal transition on a segment of transmission line 1101 at a respective rate, and each of repeaters 1141-1143 is sized to propagate an opposite signal transition on a segment of transmission line 1102 at a respective rate different from the rate of propagation on a substantially parallel corresponding segment of transmission line 1101. Repeaters 1134 and 1144, on the other hand, represent balanced repeaters, which are sized to propagate opposite signal transitions at substantially equal rates, but since they follow at least one of repeaters 1131-1133 and 1141-1143 respectively, they do not diminish the effectiveness of the repeater tapering in reducing the worst-case coupling factor for adjacent transmission lines. It will also be appreciated that even though the sizes 2$n$, 4$p$, 6$n$, and 8$p$ are consistent with one embodiment of tapering repeaters for lower-voltage-level-to-higher-voltage-level transitions on transmission line segments 1110 and 1120; repeaters 1134 and 1144 could also have been given, for example, p-type transistor sizes of 4$p$ and n-type transistor sizes of 4$n$ without diminishing the effectiveness of the repeater tapering or departing from the principles of the present invention.

For one embodiment of the pair 1100 of static transmission lines, both of repeaters 1131 and 1141 have n-type transistors of size 2$n$, which is significantly smaller than their p-type transistors of size 8$p$. Therefore, the propagation rates on transmission line segments 1111 and 1121 will be slower for the lower-voltage-level-to-higher-voltage-level transitions on transmission line segments 1110 and 1120 than for the higher-voltage-level-to-lower-voltage-level transitions. Repeaters 1132 and 1142, having p-type transistor of size 4$p$; and repeaters 1133 and 1143 having n-type transistors of size 6$n$ are sequentially increasing or tapered in a direction towards the signal source for a lower-voltage-level-to-higher-voltage-level signal transition on transmission line segments 1110 and 1120. Likewise, when the totals of their respective n-type and p-type transistor sizes are considered, repeaters 1131-1134 and repeaters 1141-1144 are tapered in a direction towards the signal source. On the other hand, repeaters 1132, 1134, 1142 and 1144, having n-type transistors of size 8$n$; and repeaters 1131, 1133, 1141 and 1143 having p-type transistors of size 8$p$ are not tapered for higher-voltage-level-to-lower-voltage-level transitions on transmission line segments 1110 and 1120. Thus, tapering repeaters on transmission lines of a bus in a direction towards the signal source for one kind of transitions and not tapering for the opposite transitions, a worst-case coupling factor of 2 may be avoided.

Figure 12:
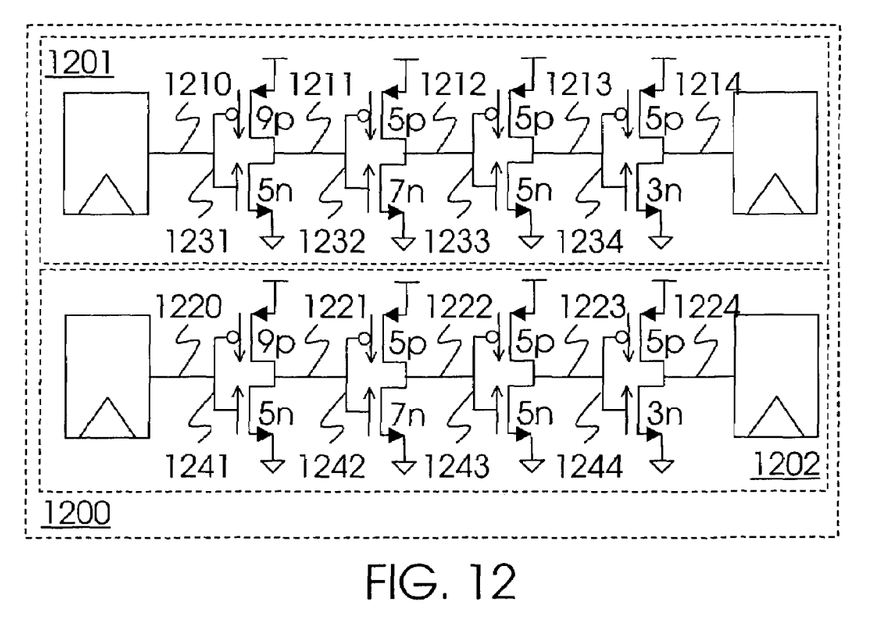
FIG. 12 illustrates another alternative embodiment of static transmission lines with repeater tapering.

FIG. 12 illustrates another alternative embodiment of a pair 1200 of static transmission lines 1201 and 1202 with tapered repeaters. For one embodiment of the pair 1200 of static transmission lines, each of the repeaters 1231, 1232 and 1234 is sized to propagate a signal transition on a segment of transmission line 1201 at a respective rate, and each of repeaters 1241, 1242 and 1244 is sized to propagate an opposite signal transition on a segment of transmission line 1202 at a respective rate different from the rate of propagation on a substantially parallel corresponding segment of transmission line 1201. Repeaters 1233 and 1243, on the other hand, represent balanced repeaters, which are sized to propagate opposite signal transitions at substantially equal rates, but since they follow at least one of repeaters 1231-1232 and 1241-1242 respectively, they do not diminish the effectiveness of the repeater tapering in reducing the worst-case coupling factor for adjacent transmission lines. It will also be appreciated that even though the sizes 9$p$, 7$n$, 5$p$, and 3$n$ are consistent with one embodiment of tapering repeaters for higher-voltage-level-to-lower-voltage-level transitions on transmission line segments 1210 and 1220; repeaters 1233 and 1243 could also have been given, for example, p-type transistor sizes of 8$p$ and n-type transistor sizes of 8$n$ without diminishing the effectiveness of the repeater tapering or departing from the principles of the present invention.

For one embodiment of the pair 1200 of static transmission lines, both of repeaters 1231 and 1241 have n-type transistors of size 5$n$, which is significantly smaller than their p-type transistors of size 9$p$. Therefore, the propagation rates on transmission line segments 1211 and 1221 will be slower for the lower-voltage-level-to-higher-voltage-level transitions on transmission line segments 1210 and 1220 than for the higher-voltage-level-to-lower-voltage-level transitions. Repeaters 1232 and 1242, having n-type transistors of size 7$n$; and repeaters 1234 and 1244 having n-type transistors of size 3$n$ are sequentially decreasing or tapered in a direction away from the signal source for a higher-voltage-level-to-lower-voltage-level signal transition on transmission line segments 1210 and 1220. Likewise, when the totals of their respective n-type and p-type transistor sizes are considered, repeaters 1231-1234 and repeaters 1241-1244 are tapered in a direction away from the signal source. On the other hand, repeaters 1232, 1234, 1242 and 1244, having p-type transistors of size 5$p$; and repeaters 1231, 1233, 1241 and 1243 having n-type transistors of size 5$n$ are not tapered for a lower-voltage-level-to-higher-voltage-level transitions on transmission line segments 1210 and 1220. Thus, tapering repeaters on transmission lines of a bus in a direction away from the signal source for one kind of transitions and not tapering for the opposite transitions, a worst-case coupling factor of 2 may be avoided.

Figure 13:
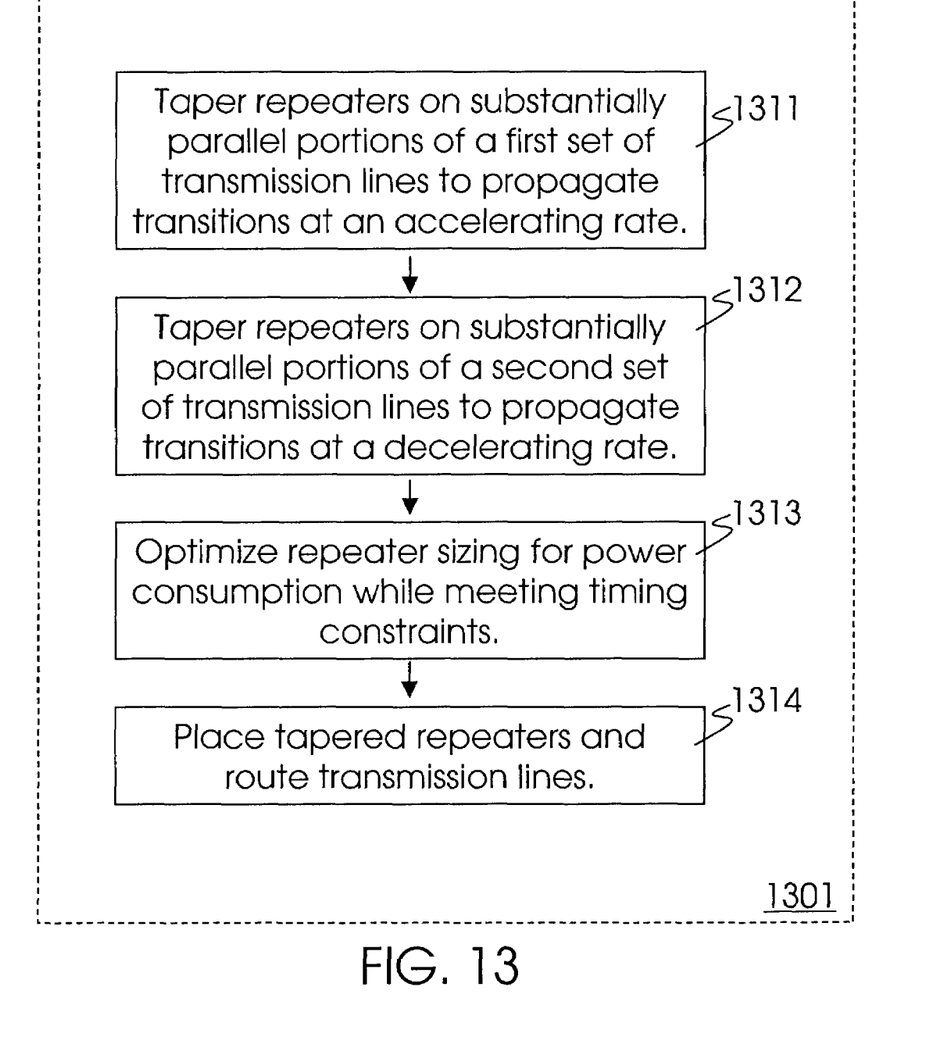
FIG. 13 illustrates a flow diagram for one embodiment of a process to taper transmission line repeaters.

FIG. 13 illustrates a flow diagram for one embodiment of a process 1301 to taper transmission line repeaters. Process 1301 and other processes herein disclosed are performed by processing blocks that may comprise dedicated hardware or software or firmware operation codes executable by general purpose machines or by special purpose machines or by a combination of both.

In processing block 1311 repeaters are tapered on substantially parallel portions of a first set of transition lines to propagate transitions at an accelerating rate. Processing continues in processing block 1312 where repeaters are tapered on substantially parallel portions of a second set of transition lines to propagate transitions at a decelerating rate. In processing block 1313, repeater sizing is optimized for power consumption while meeting time constraints. Finally, in processing block 1314, repeaters are placed and transmission lines are routed.

Figure 14:
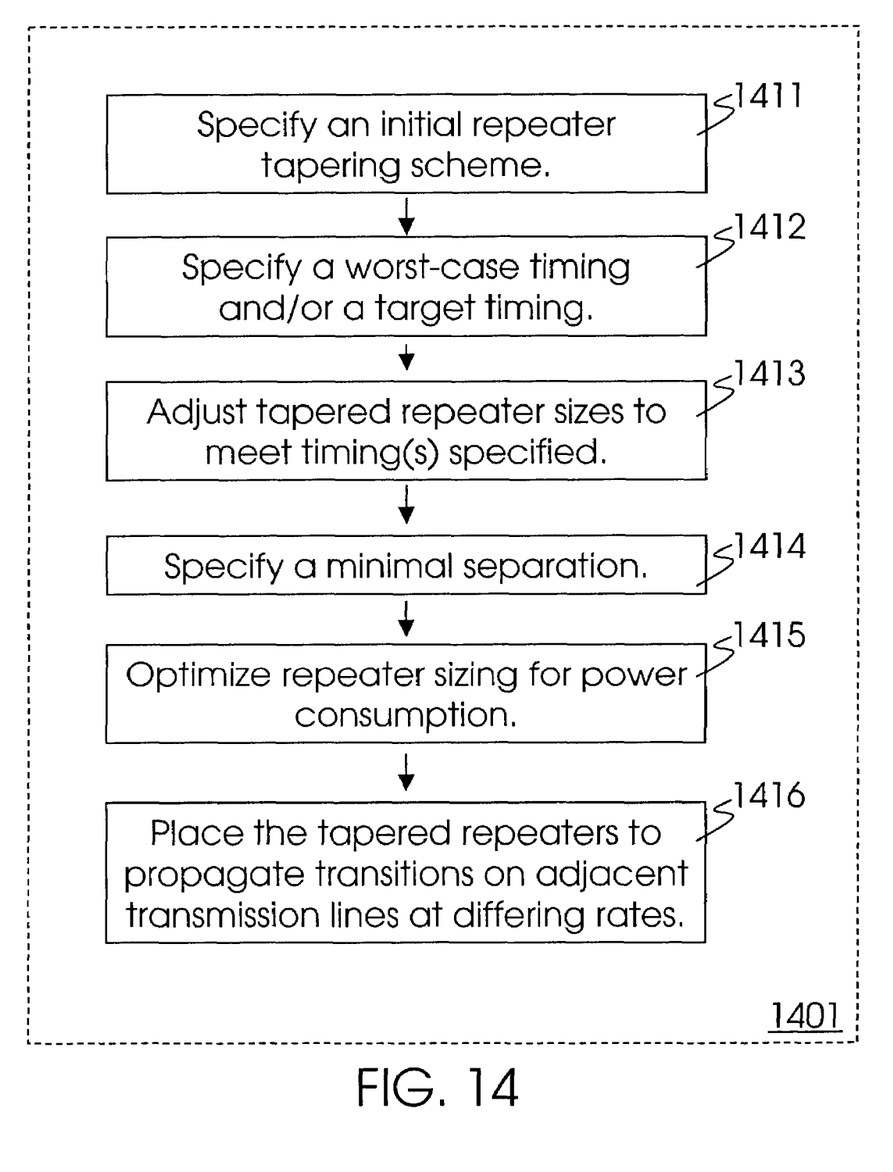
FIG. 14 illustrates a flow diagram for an alternative embodiment of a process to taper transmission line repeaters.

FIG. 14 illustrates a flow diagram for an alternative embodiment of a process 1401 to taper transmission line repeaters. In processing block 1411 an initial repeater tapering scheme is specified. Processing continues in processing block 1412 where a worst-case timing and/or target timing is specified. In processing block 1413, tapered repeater sizing is adjusted to meet the timing(s) specified. In processing block 1414 a minimal separation is specified. Processing continues in processing block 1415 where repeater sizing is optimized for power consumption. Finally, in processing block 1416, the tapered repeaters are placed to propagate signal transitions on adjacent transmission lines at different rates.

Figure 15:
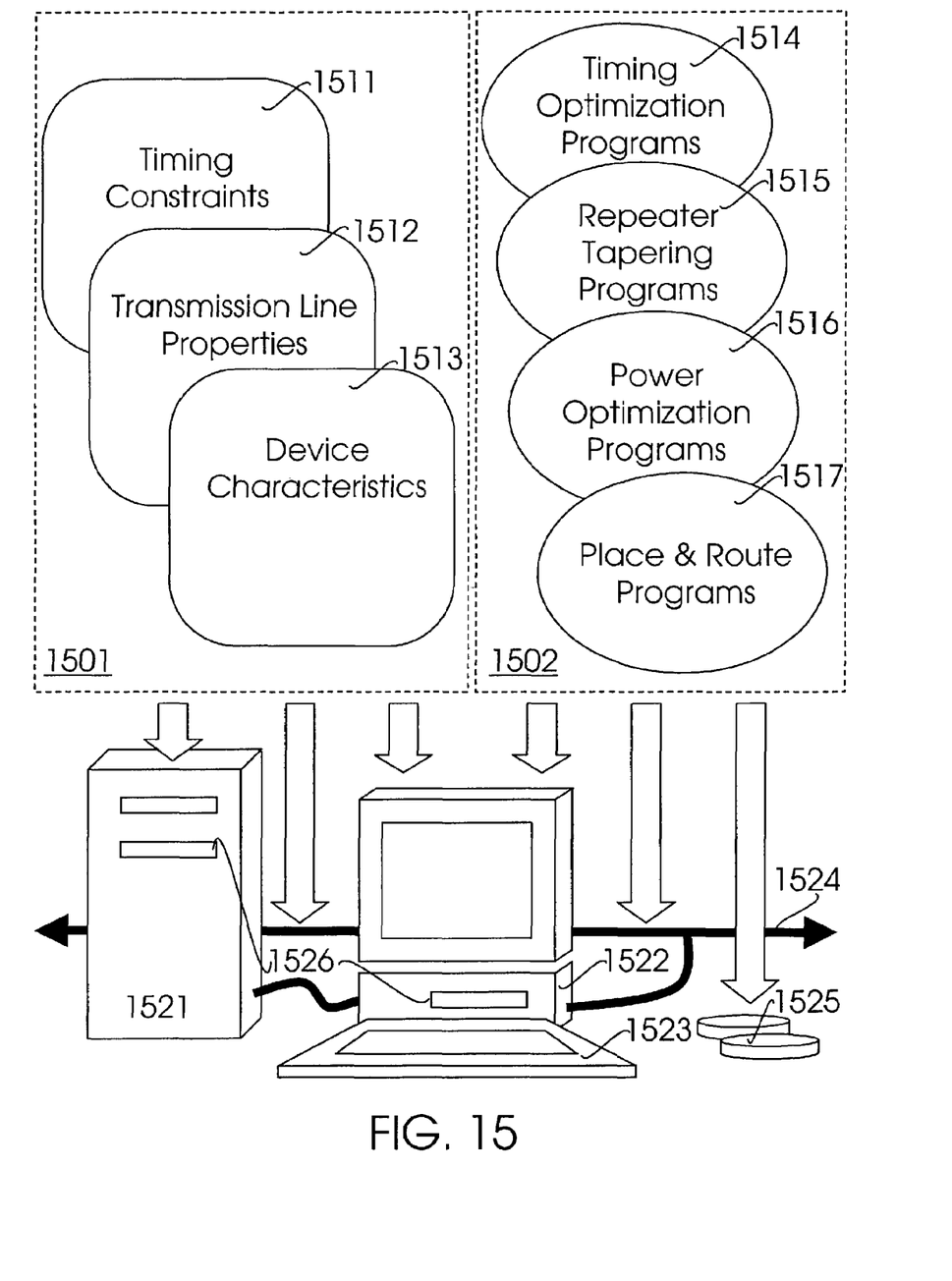
FIG. 15 illustrates one embodiment of a computing system to design transmission lines with repeater tapering.

FIG. 15 illustrates one embodiment of a computing system to design transmission lines with repeater tapering. Computer system 1522 is connectable with various storage, transmission and I/O devices to receive data structures and programmed methods. Representative data structures 1501 may include but are not limited to timing constraints 1511, transmission line properties 1512, and device characteristics 1513. Representative programmed methods 1502 may include but are not limited to timing optimization programs 1514, repeater tapering programs 1515, power optimization programs 1516, and place and route programs 1517. Components of either or both of the data structures and programmed methods may be stored or transmitted on devices such as removable storage disks 1525, which may be accessed through an access device 1526 in computer system 1522 or in a storage serving system 1521. Storage serving system 1521 or computer system 1522 may also include other removable storage devices or non-removable storage devices suitable for storing or transmitting data structures 1501 or programmed methods 1502. Component data structures and programmed methods may also be stored or transmitted on devices such as network 1524 for access by computer system 1522 or entered by users through I/O device 1523. It will be appreciated that systems such as the one illustrated are commonly available and widely used in the art of designing finite state hardware systems. It will also be appreciated that the complexity, capabilities, and physical forms of such design systems improves and changes rapidly, and therefore understood that the design system illustrated is by way of example and not limitation.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A method comprising:
tapering a first plurality of repeaters on one or more portions of a first transmission line to propagate a first signal transition at a first set of rates; and
tapering a second plurality of repeaters on one or more portions of a second transmission line, substantially parallel to the one or more portions of the first transmission line, to propagate a second signal transition at a second set of rates different from the first set of rates,
wherein the first plurality of repeaters are tapered in a first direction with respect to the propagation of the first signal transition; and
the second plurality of repeaters are tapered in a second direction with respect to the propagation of the second signal transition, the second direction being opposite the first direction.

2. The method of claim 1 wherein the first plurality of repeaters are tapered in the first direction with respect to the propagation of all signal transitions of the first transmission line and the second plurality of repeaters are tapered in the second direction with respect to the propagation of all signal transitions of the second transmission line.

3. A method comprising:
tapering a first plurality of repeaters on one or more portions of a first transmission line to propagate a first signal transition at a first set of rates; and
tapering a second plurality of repeaters on one or more portions of a second transmission line, substantially parallel to the one or more portions of the first transmission line, to propagate a second signal transition at a second set of rates different from the first set of rates,
wherein the first plurality of repeaters are tapered in a first direction with respect to the propagation of the first signal transition; and
the second plurality of repeaters are tapered in a second direction with respect to the propagation of the second signal transition, the second direction being opposite the first direction whenever the second signal transition is opposite the first signal transition.

4. A method comprising:
tapering a first plurality of repeaters on one or more portions of a first transmission line to propagate a first signal transition at a first set of rates; and
tapering a second plurality of repeaters on one or more portions of a second transmission line, substantially parallel to the one or more portions of the first transmission line, to propagate a second signal transition at a second set of rates different from the first set of rates,
wherein the first plurality of repeaters are tapered in a first direction with respect to the propagation of the first signal transition; and
the second plurality of repeaters are tapered in a second direction with respect to the propagation of a third signal transition, said third signal transition being substantially similar to the first signal transition whenever the second direction is the same as the first direction.

5. A method comprising:
tapering a first plurality of repeaters on one or more portions of a first transmission line to propagate a first signal transition at a first set of rates; and
tapering a second plurality of repeaters on one or more portions of a second transmission line, substantially parallel to the one or more portions of the first transmission line, to propagate a second signal transition at a second set of rates different from the first set of rates,
wherein on the one or more portions of the first transmission line, the worst-case number of transitions of the first signal propagation overlapping with transitions of the second signal propagation is reduced in comparison to both the first and second signal transitions being propagated at substantially similar rates.

6. The method of claim 5 wherein on the one or more portion of a second transmission line, the worst-case number of transitions of the first signal propagation overlapping with transitions of the second signal propagation is minimized.

7. A method comprising:
tapering a first plurality of repeaters on one or more portions of a first transmission line to propagate a first signal transition at a first set of rates; and
tapering a second plurality of repeaters on one or more portions of a second transmission line, substantially parallel to the one or more portions of the first transmission line, to propagate a second signal transition at a second set of rates different from the first set of rates,
wherein the repeaters on the one or more portions of the first transmission line are tapered to propagate the first signal transition at a decelerating set of rates and repeaters on the one or more portions of the second transmission line are sized to propagate the second signal transition at an accelerating set of rates.

8. The method of claim 7 wherein the repeaters on the one or more portions of the first transmission line are tapered to propagate the first signal transition at a decelerating first set of rates when the first signal transition is a transition from a lower voltage level to a higher voltage level and the repeaters on the one or more portions of the second transmission line are sized to propagate the second signal transition at an accelerating second set of rates when the second signal transition is a transition from a higher voltage level to a lower voltage level.

9. The method of claim 8 wherein the one or more portions of the first and second transmission lines are continuous.

10. A method comprising:
tapering a first plurality of repeaters on one or more portions of a first transmission line to propagate a first signal transition at a first set of rates; and
tapering a second plurality of repeaters on on one or more portions of a second transmission line, substantially parallel to the one or more portions of the first transmission line, to propagate a second signal transition at a second set of rates different from the first set of rates,
wherein the first plurality of repeaters are tapered to propagate the first signal transition at a first set of decelerating rates when the first signal transition is a transition from a higher voltage level to a lower voltage level and to propagate the first signal transition at a first set of accelerating rates when the first signal transition is a transition from a lower voltage level to a higher voltage level.

11. A method comprising:
tapering a first plurality of repeaters on one or more portions of a first transmission line to propagate a first signal transition at a first set of rates; and
tapering a second plurality of repeaters on one or more portions of a second transmission line, substantially parallel to the one or more portions of the first transmission line, to propagate a second signal transition at a second set of rates different from the first set of rates,
wherein a first one of the one or more portions of the first transmission line having a fastest rate of the first set of rates is adjacent to a substantially parallel second one of the one or more portions of the second transmission line having a slowest rate of the second set of rates.

12. An apparatus comprising:
a first plurality of repeaters of a first transmission line, the first plurality of repeaters tapered to propagate a first signal transition at a first set of rates; and
a second plurality of repeaters of a second transmission line, substantially parallel to the portion of the first transmission line, the second plurality of repeaters tapered to propagate a second signal transition at a second set of rates different from the first set of rates,
wherein a lower-voltage-to-higher-voltage-transition signal path and a higher-voltage-to-lower-voltage-transition signal path through the first and second pluralities of repeaters are tapered in opposite directions.

13. An apparatus comprising:
a first plurality of repeaters of a first transmission line, the first plurality of repeaters tapered to propagate a first signal transition at a first set of rates; and
a second plurality of repeaters of a second transmission line, substantially parallel to the portion of the first transmission line, the second plurality of repeaters tapered to propagate a second signal transition at a second set of rates different from the first set of rates,
wherein the first signal transition is a transition from a lower voltage level to a higher voltage level and the second signal transition is a transition from a higher voltage level to a lower voltage level.

14. A bus comprising:
a first transmission line, to transmit a first signal transition;
a first set of repeaters to propagate the first signal transition at a first set of rates;
a second transmission line, substantially parallel to the first transmission line, to transmit a second signal transition; and
a second set of repeaters tapered to propagate the second signal transition at a second set of rates different from the first set of rates,
wherein the first set of repeaters are tapered in a first direction with respect to all signal transitions of the first transmission line and the second set of repeaters are tapered in a second direction with respect to all signal transitions of the second transmission line.

15. An article of manufacture comprising: a machine-accessible medium including data that, when accessed by a machine, cause the machine to:
taper a first plurality of repeaters on a first transmission line to propagate a first signal transition at a first set of rates; and
taper a second plurality of repeaters on a second transmission line, substantially parallel to the portion of the first transmission line, to propagate a second signal transition at a second set of rates different from the first set of rates
wherein the first plurality of repeaters are tapered in a first direction opposite of the first signal propagation direction and
the second plurality of repeaters are tapered in a second direction of the second signal propagation.

16. The article of manufacture of claim 15 wherein the first signal transition is a transition from a lower voltage level to a higher voltage level.

17. The article of manufacture of claim 16 wherein the second signal transition is a transition from a higher voltage level to a lower voltage level.

* * * * *